United States Patent [19]

Shimokura et al.

[11] Patent Number: 4,458,887
[45] Date of Patent: Jul. 10, 1984

[54] GAS SPRING LOCKING MECHANISM

[75] Inventors: Akihiro Shimokura, Tokyo; Tomio Imaizumi; Hiroshi Murata, both of Kanagawa, all of Japan

[73] Assignee: Tokico Ltd., Kanagawa, Japan

[21] Appl. No.: 400,054

[22] Filed: Jul. 20, 1982

[30] Foreign Application Priority Data

Jul. 20, 1981 [JP] Japan .......................... 56-107476[U]

[51] Int. Cl.³ .............................................. F16F 9/32
[52] U.S. Cl. .................................. 267/64.12; 74/527; 92/19; 92/26; 92/30; 188/67; 188/300; 267/120
[58] Field of Search ...................... 267/64.12, 118, 120, 267/167; 188/67, 265, 300; 70/181; 16/84; 92/15, 19, 23, 24, 26, 30; 74/527, 483 PB, 128

[56] References Cited

U.S. PATENT DOCUMENTS

| 2,797,937 | 7/1957 | Frishof ............................... 267/167 |
| 2,811,136 | 10/1957 | Westcott, Jr. et al. ................. 92/24 |
| 3,799,036 | 3/1974 | Slaughter ............................... 188/67 |
| 3,910,566 | 10/1975 | Pedersen et al. ..................... 267/167 |
| 3,938,793 | 2/1976 | Kaptanis et al. ..................... 267/120 |

FOREIGN PATENT DOCUMENTS

| 56-167941(A) | 12/1981 | Japan ................................... 188/300 |
| 1476496 | 6/1977 | United Kingdom ................ 267/120 |
| 2106216A | 4/1983 | United Kingdom ................ 188/300 |

Primary Examiner—Douglas C. Butler
Assistant Examiner—R. R. Diefendorf
Attorney, Agent, or Firm—Wenderoth, Lind & Ponack

[57] ABSTRACT

A gas spring comprising a cylinder, a rod slidably extending from the cylinder, and a novel locking mechanism. The mechanism comprises first and second axially contiguous recesses in the circumference of the rod, a locking member normally located in the first recess and snappingly and rockingly movable between two recesses, and axially spaced first and second actuating members cooperating with the locking member. The first actuating member comprises an engaging portion and a releasing portion being circumferentially spaced therefrom. The releasing portion acts to displace the locking member to the second recess. The second actuating member comprises an engaging portion for locking the rod and also for displacing the locking member to the first recess, and axially and circumferentially inclined guide walls for circumferentially displacing the locking member thereby guiding the same between the releasing portion and engaging portions in response to the movement of the rod.

4 Claims, 25 Drawing Figures

GAS SPRING LOCKING MECHANISM

BACKGROUND OF THE INVENTION

This invention relates to a gas spring and, particularly to a gas spring being adapted for use with such as a hatch back door of an automobile to open/close the door.

The gas spring connected to the hatch back door of the automobile enables automatically fully opening the door by simply applying a light force in opening the door. The gas spring usually comprises a cylinder containing therein pressurized gas, a piston slidably disposed in the cylinder, and a piston rod connected to the piston and extending to the outside through one end of the cylinder. The pressurized gas contained in the cylinder acts to bias the gas spring to the most extended condition. The pressure of the gas in the gas spring determines the opening speed of the door and the force required for closing the door. When the pressure of the gas decreases excessively due to such as the ambient temperature being excessively decreased, the pressurized gas enclosed in the gas spring cannot maintain the door in the fully opened condition. Therefore, it is required to provided a locking mechanism in the gas spring which can releasably lock the piston or the piston rod at a desired length condition. The locking mechanism is required to have a simple construction and to easily and reliably lock or release the piston or the piston rod.

SUMMARY OF THE INVENTION

An object of the invention is to provide a gas spring having a novel locking mechanism satisfying the requirements aforementioned.

The gas spring according to the invention comprises a cylinder, a piston slidably disposed in the cylinder, a piston rod connected to the piston and extending to the outside through one end of the cylinder, first and second axially contiguous recesses formed in the outer circumference of the piston rod, which recesses having oppositely inclined surfaces defining therebetween a ridge, a locking member mounted on the outer circumference of the piston rod and being snappingly and rockingly movable between the first and second recesses, resilient means for biasing the locking member against either of the recesses, and first and second axially spaced actuating members provided on the inner circumferential wall of the cylinder for cooperating with the locking members. The first actuating member has a first engaging portion for engaging with the locking member being located in the first recess thereby restricting the movement of the piston rod in one direction, and a releasing portion for engaging with the locking member being located in the first recess thereby rockingly moving the locking member from the first recess to the second recess in response to the movement of the piston rod in the one direction, and the second actuating member has a second engaging portion for engaging with the locking member being located in the first recess thereby restricting the movement of the piston rod in the other direction. The releasing portion and the second engaging portion are axially aligned, and the first engaging portion is circumferentially displaced therefrom, and the second actuating member further has an axially and circumferentially inclined guide walls for engaging with the locking member thereby circumferentially displacing the same relative to the actuating members and guiding between the first and second engaging portions.

Preferably, the first and second recesses are annular, and a plurality of circumferentially equally spaced locking members cooperate with annular first and second actuating members, which also have respectively a plurality of circumferentially equally spaced first engaging portions and first releasing portions and second engaging portions and axially and circumferentially equally spaced inclined walls.

BRIEF DESCRIPTION OF THE DRAWINGS

Further objects and advantages of the invention will become apparent from the following detailed description taken in connection with accompanying drawings exemplifying some preferred embodiments of the invention, in which.

DETAILED DESCRIPTION OF THE PREFERRED EMBODIMENTS

Figure 1:
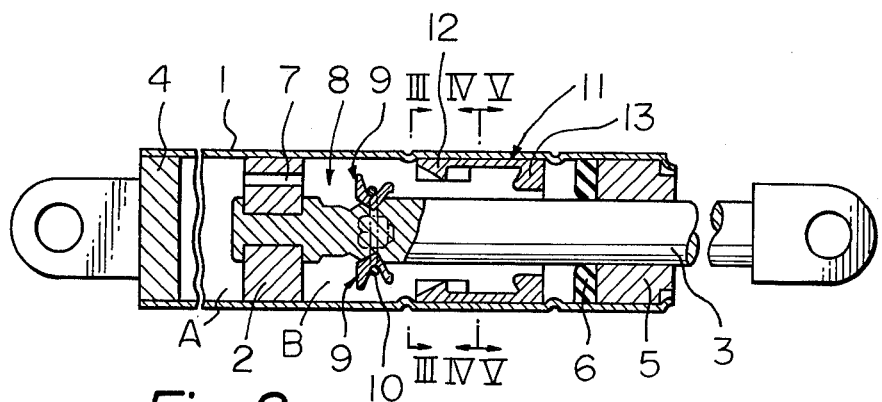
FIG. 1 is a longitudinal sectional view of a gas spring according to the invention.

The gas spring shown in FIG. 1 comprises a cylinder 1, a piston 2 slidably disposed in the cylinder 1, and a piston rod 3 with one end thereof being connected to the piston and the other end extending to the outside of the cylinder 1. One end of the cylinder 1 is closed by a cap 4, and the other end thereof is closed by a rod guide 5 having an opening for passing therethrough the piston rod 3 and by an seal member 6 being provided on the inner side of the rod guide 5. The interior of the cylinder 1 is closed from the outside and is partitioned into two chambers A and B by the piston 2. The chambers A and B receive therein pressurized gas and are permanently connected with each other through an opening 7 formed in the piston. Thus, the piston 2 receives in the rightward direction in FIG. 1 a force corresponding to the pressure of the gas enclosed multiplied by the cross-sectional area of the piston rod 3.

Figure 7A:
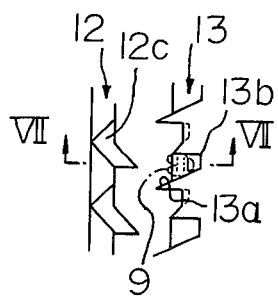
FIGS. 7A, 8A, 9A, 10A, 11A and 12A are views similar to FIG. 6A but showing respective operational conditions.
Figure 7B:
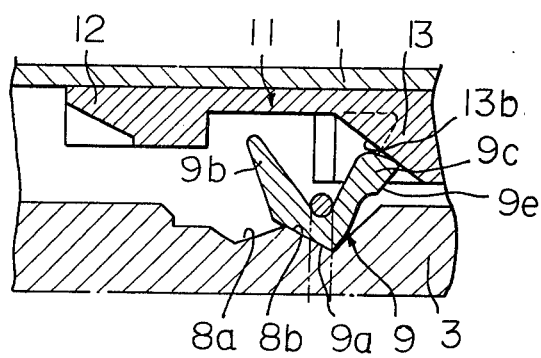
FIGS. 7B, 8B, 9B, 10B, 11B and 12B are views similar to FIG. 6B and corresponding respectively to FIGS. 7A, 8A, 9A, 10A, 11A and 12A.
Figure 10A:
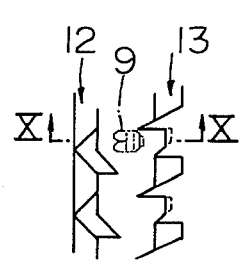
Figure 10B:
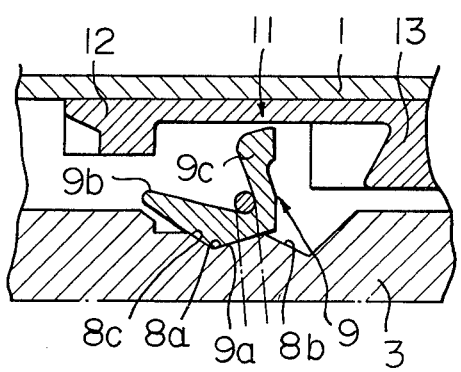

There are provided in the outer circumference of the piston rod 3 near to the piston 2 a recess portion 8 consisting of a first annular recess 8b and a second annular recess 8a. The first and second recesses define oppositely axially inclined contiguous walls 8b and 8a defining therebetween an annular ridge. The first and second recesses shown in the drawing are generally V-shaped configurations defined respectively by oppositely inclined walls 8b and 8d and by oppositely inclined walls 8a and 8c, however, the configuration thereof may be modified as desired. The recesses 8b and 8a snappingly and selectively receive therein a plurality of (four in the embodiment) circumferentially equally spaced locking members 9 which are resiliently urged against the outer circumference of the piston rod 3 by a resilient ring 10 such as a rubber ring or an annular coil spring. Each locking member 9 has a bottom surface 9a and radially outwardly projecting two legs 9b and 9c. When the locking member 9 is received in the first recess 8b with the bottom surface 9a generally engaging with the inclined wall 8b, the leg 9b extends radially outwards, and the locking member takes a lock position as shown in FIGS. 7B and 8B. When the locking member 9 is received in the second recess 8a with the bottom surface 9a generally engaging with the inclined wall 8a, the leg 9b inclines radially inward direction as shown in FIG. 10 B, and such condition is defined as a release position of the locking member 9. The locking member 9 snappingly and rockingly moves between the lock position and the release position and, in the rocking movement, the bottom surface 9a rides over the ridge defined between the recesses 8a and 8b. As shown in FIGS. 7B and 10B, when the locking member 9 is received in either of the first and second recesses, a portion of the bottom surface 9a of the locking member 9 extends to the other of the recesses 8a and 8b so that the rocking movement of the locking member can be performed easily and smoothly.

Figure 2:
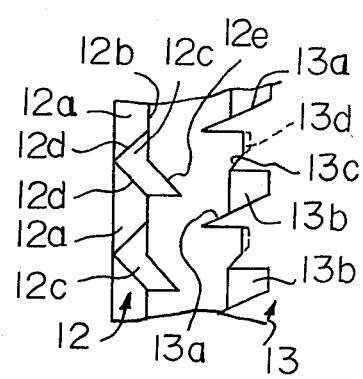
FIG. 2 is a partial developed view of an actuating member incorporated in the gas spring of FIG. 1 and as viewed in the radially outward direction.
Figure 3:
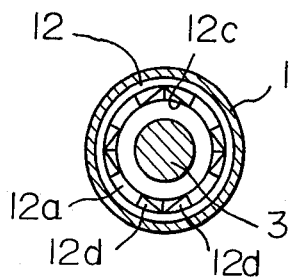
FIG. 3 is a sectional view taken along line III—III in FIG. 1.
Figure 4:
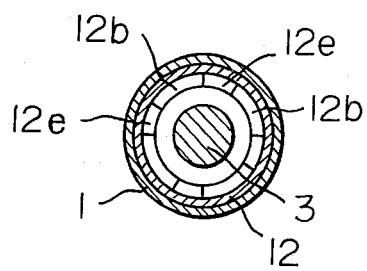
FIG. 4 is a sectional view taken along line IV—IV in FIG. 1.
Figure 5:
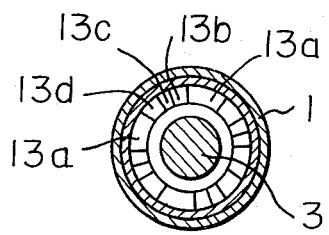
FIG. 5 is a sectional view taken along line V—V in FIG. 1.

A cylindrical member 11 having a specified configuration on the inner circumference thereof is fitted on the inner circumference of the cylinder 1 and is secured thereto by such as a caulking process. The cylindrical member 11 is a unitary member consisting of axially spaced first and second actuating members 13 and 12. The first actuating member 13 is located near to the rod guide 5 and has a plurality of circumferentially equally spaced first engaging portions 13b defining radially inwardly and axially outwardly (rightward in FIG. 7B) inclined straight lines in the longitudinal section, a plurality of releasing portions 13d defining radially inwardly and axially inwardly inclined straight lines in the longitudinal section, and two sets of axially and circumferentially inclined radial guide walls 13a and 13c as shown in FIG. 2. Preferably, each guide wall 13a, the first engaging portion 13b, the guide wall 13c and releasing portion 13d are circumferentially and sequentially arranged along the circumference of the cylindrical member 11, and cooperate with each of the locking members 9.

Figure 6A:
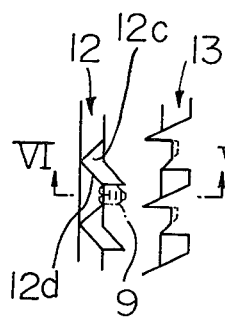
FIGS. 6A is a partial developed view of the actuating member and showing the relative position of one of locking members at one operational condition of the gas spring.
Figure 6B:
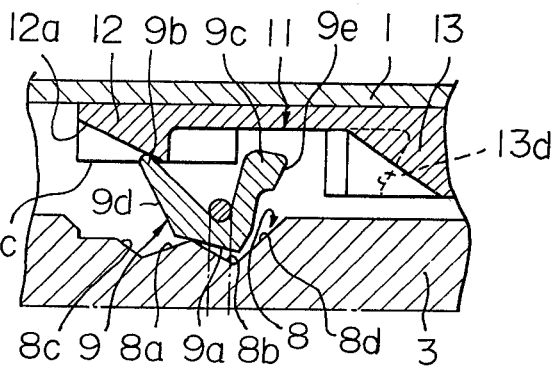
FIG. 6B is a partial, enlarged half view in cross-section taken along line VI—VI in FIG. 6A.

The second actuating member 12 is spaced axially from the first actuating member 13 and comprises a plurality of inclined portions 12a defining a radially inwardly and axially outwardly inclined straight line in the longitudinal section as shown in FIG. 6B, a plurality of second engaging portions 12b defining a radially extending straight line in the cross-section, a plurality of circumferentially spaced projecting portions 12c defined by a straight line parallel to the axis of the rod in the longitudinal section, a plurality of axially and circumferentially inclined radial guide walls 12d, and a plurality of axially and circumferentially inclined radial guide walls 12d. These portions and walls 12a, 12b, 12c, 12d and 12e are arranged sequentially in the circumferential direction, and the number or sets of which preferably corresponds to the number of the locking members 9. It will be understood that portions 12a, 12c, 13b and 13d which are defined by straight lines in the longitudinal section may not necessary be flat surfaces, but preferably have arcuate configurations in the transverse cross-section. Further, in the embodiment, each radial guide wall 12d consists of two axially outwardly and circumferentially diverging walls 12d and 12d as shown in FIG. 2, and which is advantageous in decreasing the axial length of the actuating member 12.

The first actuating member 13 projects radially inwardly as compared with the second actuating member 12 as shown in the drawings.

Further, the releasing portion 13d aligns in the axial direction with the second engaging portion 12b, and the first engaging portion 13b is displaced circumferentially therefrom.

The operation of the gas spring having aforesaid constitution will hereinafter be explained with reference to FIG. 6A through FIG. 12B.

Firstly, it is assumed that the gas spring is in somewhat contracted condition as shown in FIG. 1 with an external force acting on the gas spring, and that the locking members 9 are located in the first recess 8b or in the lock position. When the external force is removed, the piston 2 and the piston rod 3 move rightward as viewed as FIGS. 1 and 6B. The leg 9c of each locking member 9 freely passes through the second actuating member 12, but the leg 9b of each locking member 9 usually engages with the guide wall 12d, whereby each locking member 9 is circumferentially displaced relative to the actuating member 12, and is guided by the inclined portion 12a. When the leg 9b passes across the second actuating member 12, the locking member 9 rocks in the counter-clockwise direction by a small amount, but the locking member 9 maintains the lock position as shown in FIG. 6B. After passing through the second actuating member 12, the leg 9c of each locking member 9 engages with each of the guide walls 13a of the first actuating member 13 and is displaced circumferentially along the guide wall 13a as shown in FIG. 7A and finally engages with the first engaging portion 13b. The rightward movement of the piston rod 3 is locked by the locking members 9, as shown in FIG. 7B. The gas spring takes the most extended condition.

When an external force acts on the gas spring in the contracting direction and overcomes the pressure of the gas enclosed, the piston rod moves leftward and the leg 9b of each locking member engages with each of the inclined guide walls 12e and the locking members are displaced in the circumferential direction along the guide walls 12e and the leg 9b of each locking member 9 engages with each of the engaging portion 12b of the second actuating member 12 which presses the locking member 9 against the first recess 8b thereby preventing the movement of the piston rod in the leftward direction as shown in FIG. 8B.

Figure 8A:
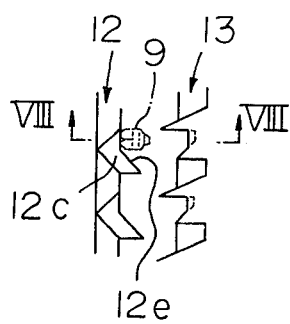
Figure 8B:
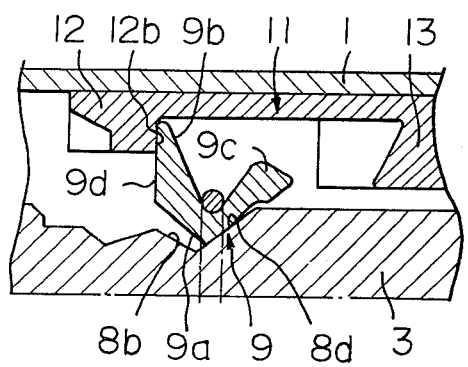
Figure 9A:
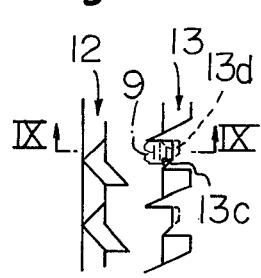
Figure 9B:
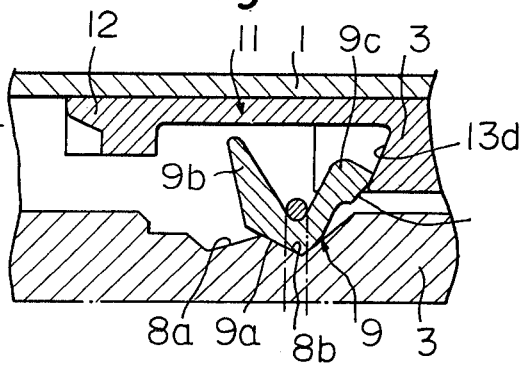

In releasing the lock condition of the gas spring, the piston rod 3 is firstly displaced rightward from the condition of FIGS. 8A and 8B, then, the leg 9c of each locking member 9 engages with the release portion 13d of the first actuating member 13 as shown in FIG. 9B. By further displacing the piston rod 3 rightwards, the release portions 13d act to snappingly and rockingly displace the locking members 9 to the second recess 8b or from the lock position to the release position as shown in FIG. 10B. At this process, the locking members 9 do not displace in the circumferential direction since the second engaging portions 12b of the second actuating member 12 align respectively with release portions 13d of the first actuating member 13.

Figure 11A:
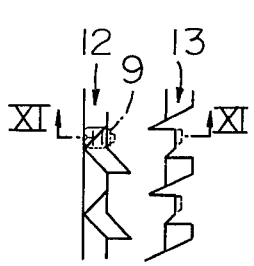
Figure 11B:
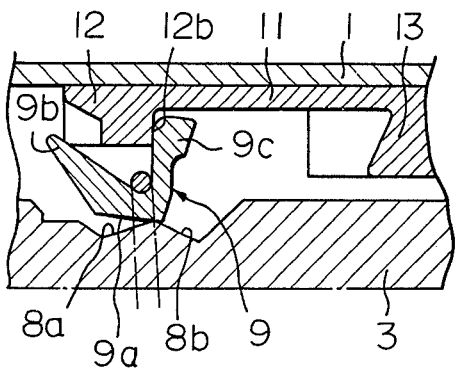
Figure 12A:
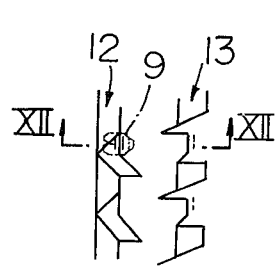
Figure 12B:
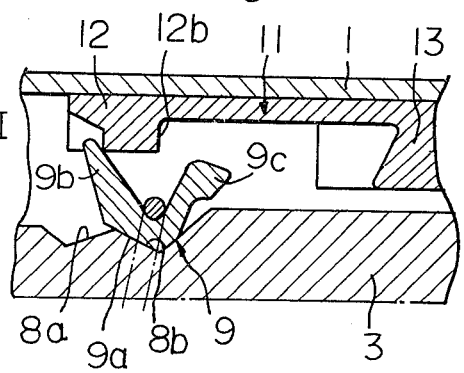
Figure 13:
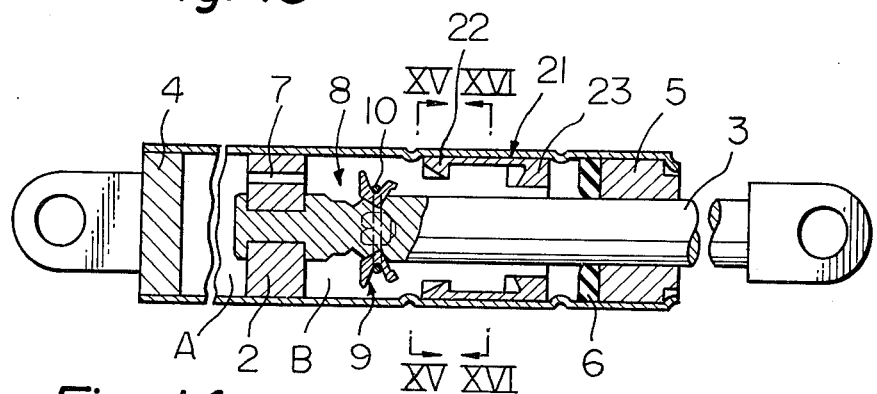
FIG. 13 is a longitudinal sectional view of a gas spring according to a second embodiment of the invention.
Figure 14:
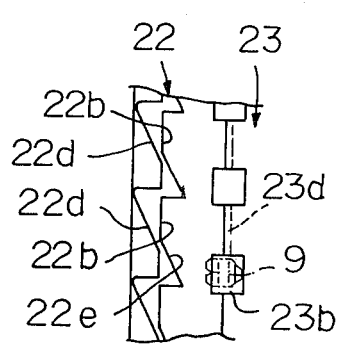
FIG. 14 is a partial developed view of the actuating member of the gas spring of FIG. 13.
Figure 15:
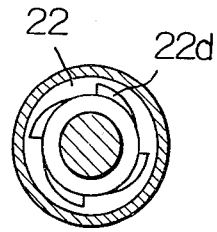
FIGS. 15 and 16 are sectional views taken along lines XV—XV and XVI—XVI respectively.
Figure 16:
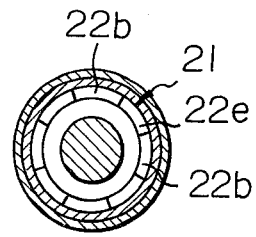

When the piston rod 3 is displaced leftwards from the condition of FIG. 10B, the legs 9b of the locking members 9 freely pass through the second actuating member 12, however, the legs 9c of the locking member 9 engage with the second engaging portions 12b, whereby the locking members 9 snappingly and rockingly return from the release position to the lock position or from the second recess 8a to the first recess 8b as shown in FIGS. 11B and 12B.

FIG. 13 through FIG. 16 show a second embodiment of the invention, wherein parts corresponding to the first embodiment are depicted by the same reference numerals.

The cylindrical member 11 in the first embodiment is substituted by a cylindrical member 21 having first actuating member 23 and a second actuating member 22. The actuating member 22 has axially and circumferentially inclined radial guide walls 22d and 22e corresponding respectively with guide walls 12d and 12e in the first embodiment, and the axially and circumferentially inclined radial guide surfaces 13a and 13c in the first actuating member in the first embodiment are omitted. However, the first actuating member 23 has first engaging portions 23b and releasing portions 23d corresponding respectively to the first engaging portions 13b and releasing portions 13d in the first embodiment, and the second actuating member 22 has second engaging portions 22b similarly to the second engaging portions 12b of the first embodiment. The cylindrical member 21 in the second embodiment is simple in the construction as compared with the first embodiment, but the function thereof is generally similar to the first embodiment.

Figure 17:
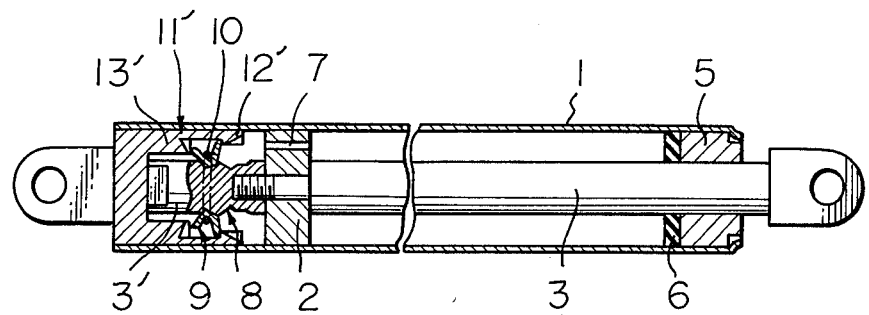
FIG. 17 is a longitudinal sectional view of a gas spring according to a third embodiment of the invention.

FIG. 17 shows a third embodiment of the invention wherein the piston rod can be locked at a contracted condition. The first and second actuating members 13' and 12' are formed integrally with a cap 13' closing the cylinder 1, and first and second axially contiguous annular recesses 8 are formed in the outer circumference of an extending portion 3' of the piston rod 3. The detailed constitution and the operation are similar to the first embodiment and, therefore, detailed description therefor is omitted.

Figure 18:
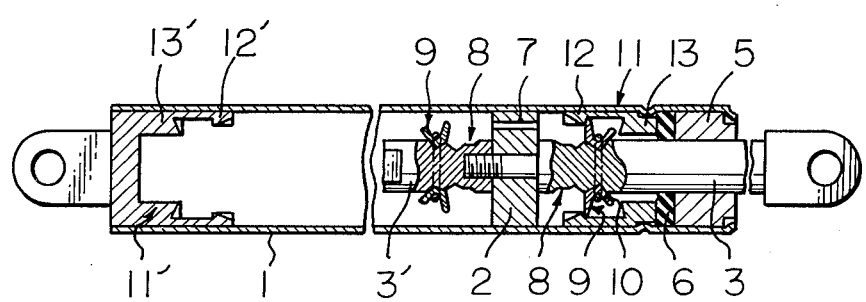
FIG. 18 is a sectional view according to a fourth embodiment of the invention.

FIG. 18 shows a still further embodiment wherein locking mechanisms are provided on the opposite ends of the cylinder 1 for locking the piston rod both at the most extended and contracted conditions.

In the embodiments, the first and second actuating members 13 and 12 are integrally formed in a cylindrical member 11, and the two actuating members may be formed separately, but, it is required to axially align the second engaging portion 12b with the releasing portion 13d, and it is advantageous to form integrally the actuating members. The locking members 9 in the embodiment displace in the circumferential direction in engaging with axially and circumferentially inclined guide walls in the embodiments, however, the clindrical member 11 in the embodiment may rotatably mounted in the cylinder. Further, the axially and radially inclined surfaces 12a in the second actuating member 12 may be omitted.

As described heretofore in detail, in the gas spring according to the invention, a locking member is mounted on the piston rod of a gas spring and is rockingly and snappingly movable between a normal lock position and a release position, and first and second axially spaced actuating members are mounted in the cylinder to cooperate with the locking member, further, the first actuating member has circumferentially spaced a first engaging portion and a releasing portion, and the second actuating member has a second engaging portion and axially and circumferentially inclined guide walls. The first engaging portion retaines the movement of the piston rod in one direction and the releasing portion displaces the locking member from the normal position to the release position in response to the piston rod in the one direction, and the second engaging portion retaines the movement of the piston rod in the other direction and also displaces the locking member from the release position to the lock position, and the guide walls displaces circumferentially the locking member between positions corresponding the first engaging portion and releasing portion.

Therefore, when the piston rod moves in one direction, the locking member is guided to the first engaging portion thereby preventing reliably the movement in the one direction. And when the piston rod is moved from that condition in the other direction, the locking member is guided to the second engaging portion and the movement thereof is stopped. In releasing the locking mechanism the piston rod is moved by a small amount in the aforesaid one direction and thereafter in the other direction. The locking member firstly displaces from the lock position to the release position and, in passing through the second actuating member, returns to the lock position. Thus the construction of the locking mechanism is simple, and the operation is reliable.

What is claimed is:

1. A gas spring comprising a cylinder (1), a piston (2) slidably disposed in the cylinder, a piston rod (3) connected to the piston and extending to the outside through one end of the cylinder, first and second axially contiguous recesses (8b, 8a) formed in the outer circumference of the piston rod, said recesses having oppositely inclined surfaces (8b, 8a) defining therebetween a ridge, a locking member (9) mounted on the outer circumference of the piston rod and being snappingly and rockingly movable between said first and second recesses, resilient means (10) for biasing the locking member against either of said recesses, and first and second axially spaced actuating members provided on the inner circumferential wall of the cylinder for cooperating with the locking member; said first actuating member having a first engaging portion (13b) for engaging with said locking member being located in said first recess (8b) thereby restricting the movement of the piston rod in one direction (rightward), and a releasing portion (13d) for engaging with said locking member being located in said first recess (8b) thereby rockingly moving said locking member from the first recess (8b) to the second recess (8a) in response to the movement of the piston rod in said one direction (rightward); said second actuating member having a second engaging portion (12b) for engaging with said locking member being located in said first recess (8b) thereby restricting the movement of the piston rod in the other direction (leftward); said releasing portion (13d) and said second engaging portion (12b) being axially aligned, and said first engaging portion (13b) being circumferentially displaced therefrom; said second actuating member further having an axially and circumferentially inclined guide wall (12e) for engaging with said locking member thereby circumferentially displacing the same relative to said actuating members and guiding between the first and second engaging portions.

2. A gas spring according to claim 1, wherein the first and second recesses are annular, and a plurality of circumferentially equally spaced locking members cooperate with annular first and second actuating members.

3. A gas spring according to claim 1, wherein said first actuating member further has axially and circumferentially inclined guide walls (13a, 13c) for engaging with said locking member thereby circumferentially displacing the same relative to said actuating members and guiding to the first engaging portion (13b) and to the releasing portion (13d) respectively, and said second actuating member further has another circumferentially and axially inclined guide wall (12d) for engaging with said locking member thereby circumferentially displacing the same relative to said actuating members and guiding the same to the first engaging portion.

4. A gas spring according to claim 1 wherein the first and second actuating members are integrally connected and secured to the inner circumference of the cylinder.

* * * * *